United States Patent [19] [11] 4,299,259
Sugimoto et al. [45] Nov. 10, 1981

[54] LEAD STORAGE BATTERY PLATES AND METHOD OF MAKING THE SAME

[75] Inventors: Hiroshi Sugimoto, Fujisawa; Shinji Karasawa, Chigasaki; Kisuke Noshi, Fujisawa; Teruaki Ishii, Yamato; Sigeki Matsuzawa, Fujisawa, all of Japan

[73] Assignee: Matsushita Electric Industrial Co., Ltd., Osaka, Japan

[21] Appl. No.: 26,228

[22] Filed: Apr. 2, 1979

[51] Int. Cl.³ .......................... B65B 3/04; H01M 4/82
[52] U.S. Cl. ..................................... 141/1.1; 29/623.5; 72/203; 204/2.1; 252/182.1; 429/234
[58] Field of Search ........................ 141/1.1, 32, 33; 204/2.1, 2; 252/182, 182.1, 425, 425.3; 29/623, 623.1, 623.2, 623.3, 623.4, 623.5; 429/234; 72/203

[56] References Cited

U.S. PATENT DOCUMENTS 4,029,856  6/1977  Cromer et al. ...................... 141/1.1

Primary Examiner—Houston S. Bell, Jr.
Attorney, Agent, or Firm—Wenderoth, Lind & Ponack

[57] ABSTRACT

This invention is directed to a method of making lead storage battery plates including the steps of notching a lead alloy sheet or other type of thin sheet, spreading the sheet in reticulated portions, expanding the sheet into a grid, and filling pasty active material into the reticulated portions. The strip of long material is cut, respectively, into plates of a given size. The open ends of the openings on the right and left ends produced during the cutting operation are sealed with synthetic resin frame body portions to prevent the slipping out of the active material filled into the reticulated portions. Therefore, lighter and thinner plates are continuously made with better operational efficiency.

4 Claims, 12 Drawing Figures

LEAD STORAGE BATTERY PLATES AND METHOD OF MAKING THE SAME

The present invention relates to a method of making lead storage battery plates using lead-alloy expanded grids.

More particularly, the present invention relates to a method of making lead storage battery plates comprising the steps of notching, spreading and expanding the lead-alloy sheet or thin sheet into reticulated grids, filling the pasty active material into the reticulated portions to provide the unit plate, and sealing both ends of the expanded portion with the synthetic resin frames so that the active material will not slip off the reticulated portions of the open ends of the expanded portion.

In making the lead storage battery plates, continuous expanded grids are used in U.S. Pat. Nos. 3,853,626, 3,867,200, 3,890,160 and 4,102,024.

When the plate is formed from such expanded grids, the reticulated grids formed from the sheets are filled with the pasty active material and thereafter are cut to the desired size of the plate. Open reticulated portions are produced at the cut ends. The active material slips out of the open reticulated portions due to impacts received during formation of a group of plates or during the assembling into the electric battery. The slipping out of the active material from the reticulated portions causes reduction in the amount of active material in a plate. If slipping out occurs inside the battery, it can cause a short circuit between the positive and negative plates.

Accordingly, it is extremely important to prevent the active material, due to simple working operation, from slipping out of the reticulated portions not only for improvement of the characteristics of the plates, but also in improvement of the entire battery.

The present invention is provided to prevent the active material from slipping out of the reticulated portions.

A primary object of the present invention is to prevent the opened reticulated portions from being produced at the cut portions when the expanded strip of material is cut, respectively, into a given size to provide grids for the desired battery plates.

Another object of the present invention is to seal the right and left open ends of the grid for each of the plates with synthetic resin frame bodies to prevent the pasty active material filled into the reticulated portions from slipping out.

A further object of the present invention is to provide a method of making the plates, comprising the steps of continuously filling the pasty active material and preventing the filled paste from slipping out even during the cutting operation.

By the method of the present invention, there is provided a lead storage battery plate wherein an expanded portion with many diamond-shaped reticulated portions are expanded between an unexpanded portion provided with integral lugs and another unexpanded portion located opposite to the one unexpanded portion, the open end portion of the expanded portion, which are not in contact with said unexpanded portions being closed with synthetic resin frames, and all the reticulated portions are filled with a pasty active material. The method of making said lead storage battery plate comprises the steps of forming an elongated strip of reticulated sheet material having openings therein and having unreticulated portions along the opposite edges thereof, placing elongated bodies of synthetic resin at intervals along said elongated strip extending across the strip at least to the unreticulated portions and adhering said elongated bodies to said strip, filling pasty active material into the openings of said strip, and then cutting the strip and said elongated bodies transversely of the strip along the centerlines of said elongated bodies for separating the battery plates from the strip.

These and other objects and features of the present invention will become apparent from the following description of a preferred embodiment thereof taken together with to the accompanying drawings, in which.

Figure 5:
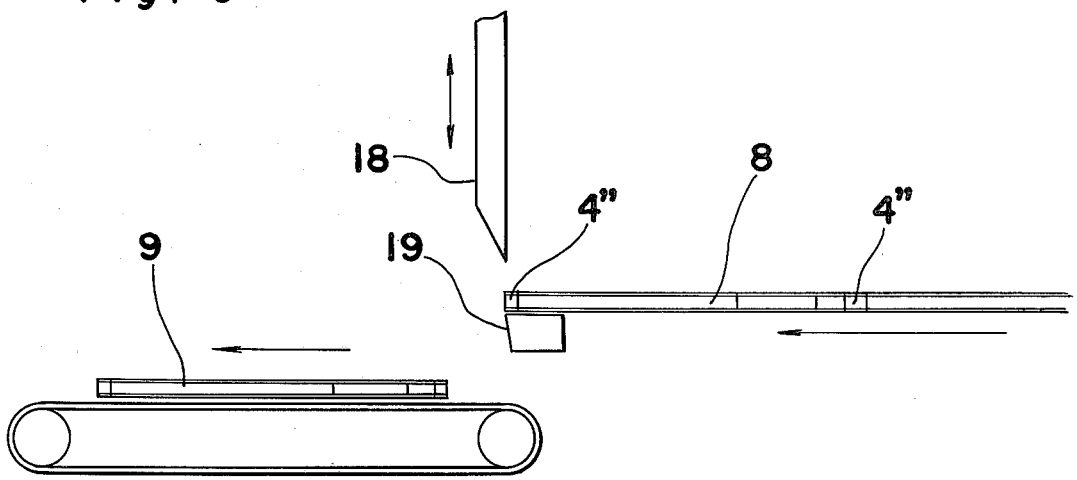
Figure 6:
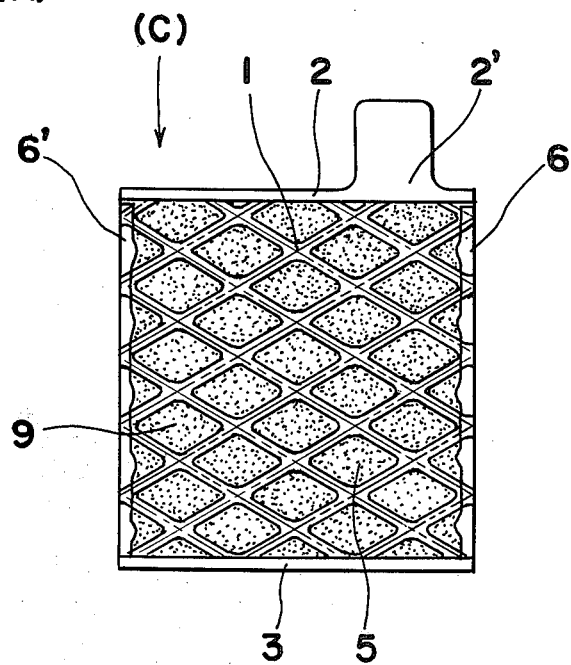
Figure 6:
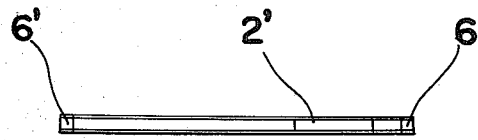
Figure 7:
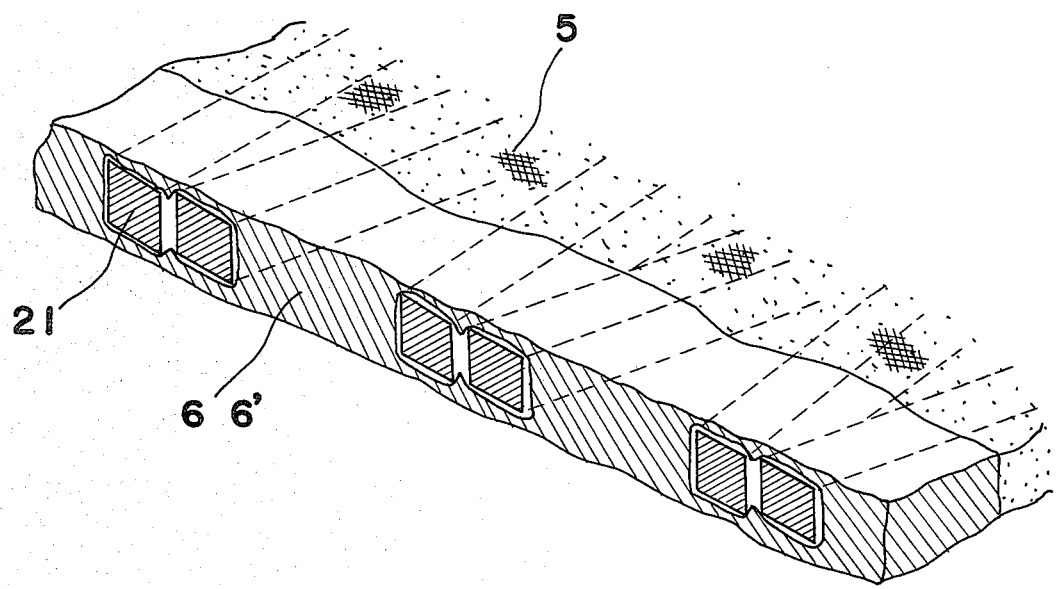
Figure 8:
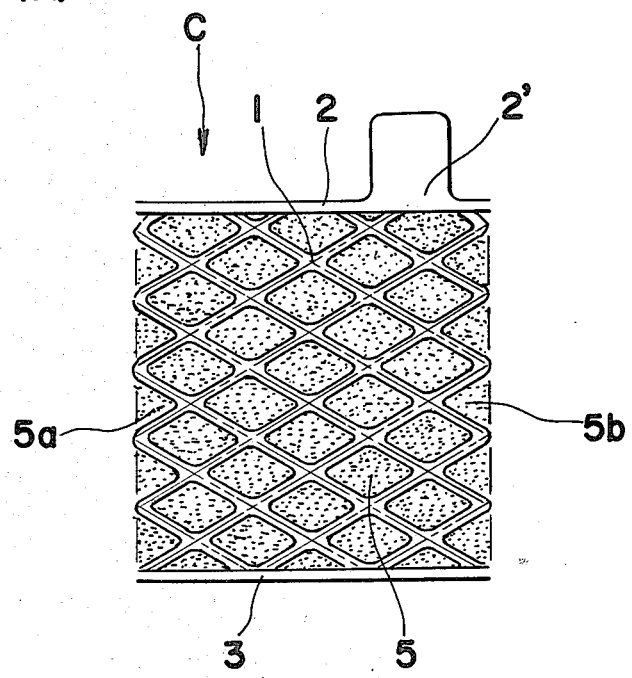
Figure 8:
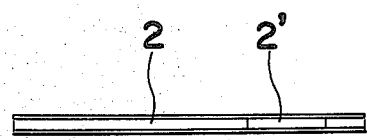
Figure 9:
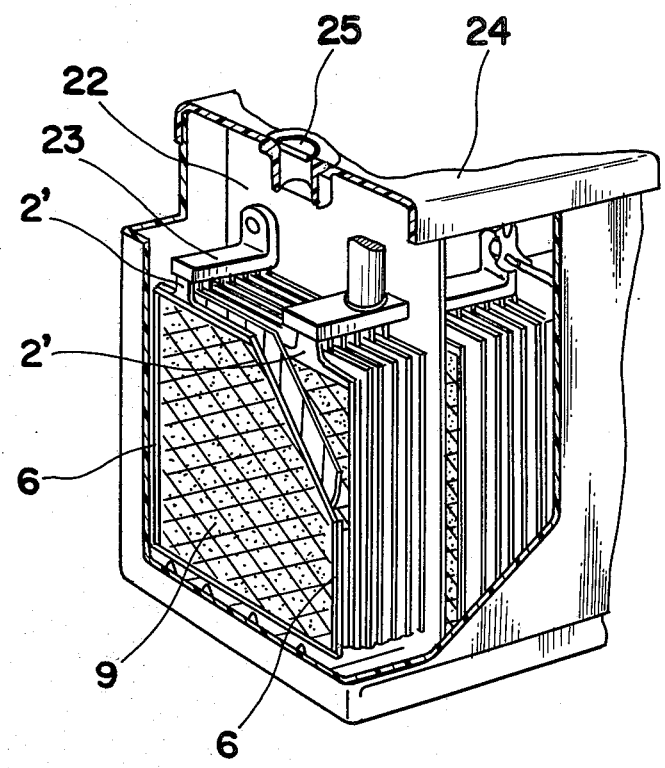

FIGS. 4(A) and (B) are a plan view showing a continuous grid with synthetic frame bodies disposed on reticulated portions and a side view thereof seen from the side C of the plan view, respectively;

FIG. 5 is a schematic side view showing how the grid filled with paste is cut into a given size at the central portion of the frame body;

FIGS. 6(A) and (B) are a plan view of a plate and a side view thereof seen from the side C of the plan view, respectively;

FIG. 7 is an enlarged perspective view, partially in cross-section, of a cut end produced when the plate has been cut;

FIGS. 8(A) and (B) are a plan view of a plate using the expanded grid and a side view thereof seen from the side C of the plan view, respectively; and FIG. 9 is a perspective view, partially broken away, showing the interior of a storage battery using the plates.

Before the description of the present invention proceeds, it is to be noted that like parts are designated by like reference numerals throughout the accompanying drawings. The present invention will be described hereinafter as a method of producing lead storage battery plates from a continuous thin sheet of lead alloy.

Figure 1:
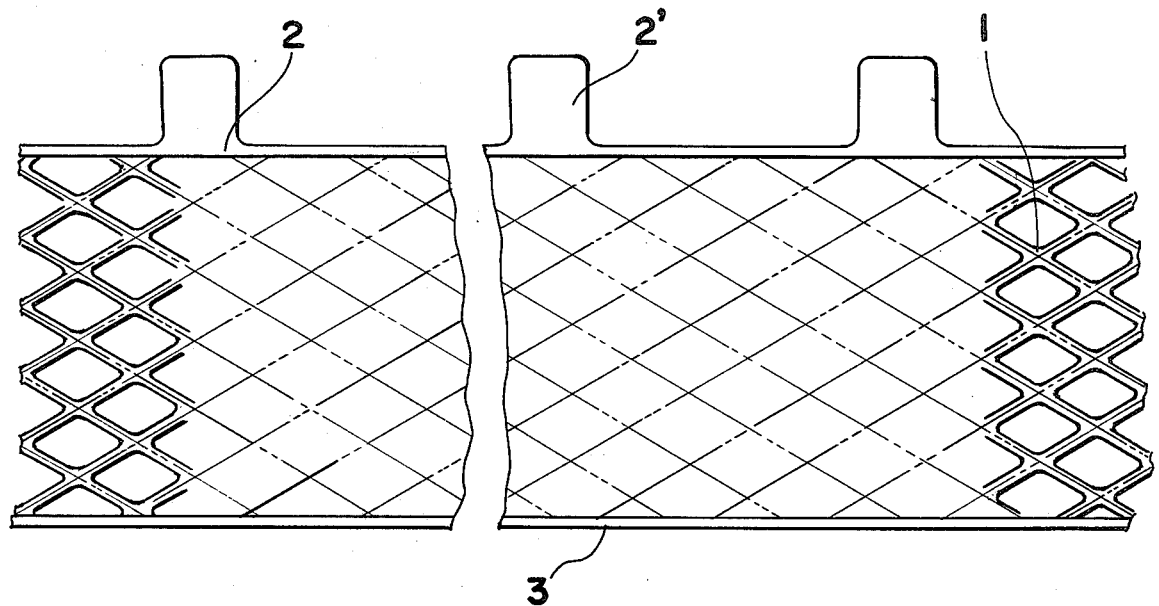
FIG. 1 is a plan view showing an expanded lead-alloy grid 1 in one embodiment of the present invention.

A continuous thin sheet, 1 mm in thickness, of lead alloy, for example Pb-Ca alloy, is expanded by an existing expansion molding machine to form continuous strip of ribbon-like expanded sheet 7 which is 0.5 to 0.8 mm thick as shown in FIG. 1. The continuous lead-alloy sheet is worked by pressing or the like so that it has a reticulated expanded portion 1 which is 105 mm wide and having diamond-shaped openings therein, and an unexpanded portion 2 which is 2.5 mm wide and having lug portions 2' and a narrow ribbon-like unexpanded portion 3 which is 2.5 mm wide located on opposite sides of the expanded portion.

Thermal plastic resin such as polypropylene is molded under pressure by a resin molding machine into frame bodies 4 which are to be placed at right angles to the longitudinal direction of the strip. The bodies 4 are 3 to 8 mm wide and have a thickness equal to the thickness of the expanded portion or such that no obstacles exist to the operation of filling paste-like active material into the openings. The bodies 4 are spaced at intervals of 100 mm along the expanded portion 1 of the strip and extend over the unexpanded portions 2 and 3 if necessary for the width of the plate to be obtained, for example, 100 mm.

Figure 2:
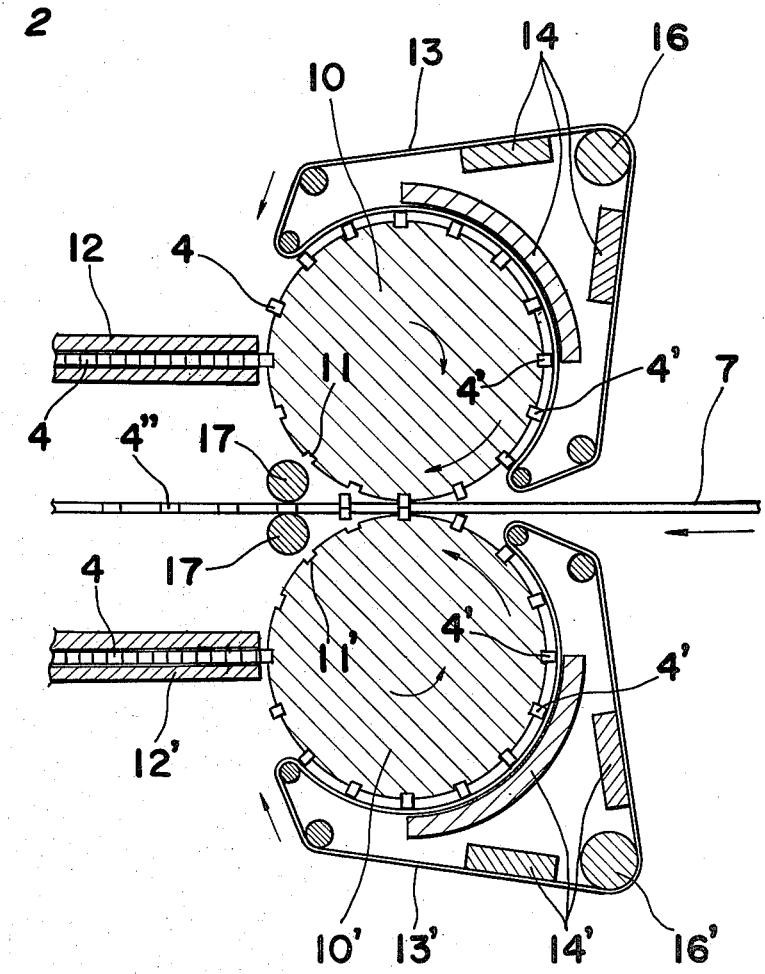
FIG. 2 is a cross-sectional view showing the essential portion of an apparatus for making lead storage battery plates which is adapted to place synthetic resin frame bodies, at given intervals, on the continuous grid of FIG. 1.
Figure 3:
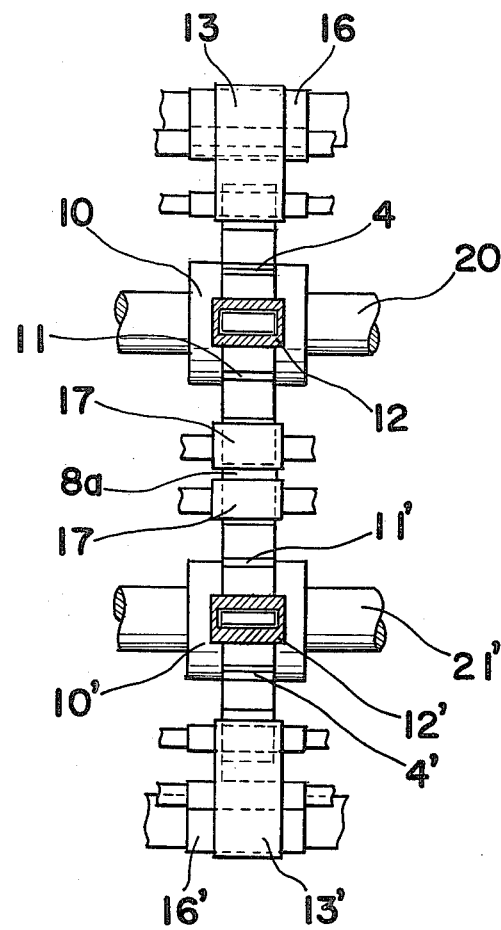
FIG. 3 is a front view, partly in section, of the apparatus of FIG. 2.

The operation of placing the resin frame bodies on the expanded portion, which is an essential feature of the present invention will be concretely described hereinafter. As shown in FIG. 2 and FIG. 3, a pair of rotary drums 10 and 10' which are vertically superposed with respect to each other with a strip of expanded sheet 7 therebetween are rotated on shafts 20 and 21' at the same peripheral speed as the advancing speed of the strip of expanded sheet 7. The peripheries of the drums, at the position where the expanded sheet is engaged, are spaced such that they contact the top and bottom surfaces of the expanded sheet. The rotary drums each have sixteen grooves 11 and 11' at equal intervals around the periphery of the rotary drum for carrying resin bars 4. The grooves 11 and 11' are positioned in the upper and lower rotary drums so that they are opposite to each other at the position of engagement of the drums with the sheet 7. Heating belts 13 and 13', which are driven at a speed equal to the peripheral speed of the rotary drum, are provided around a part of the peripheral surfaces of the rotary drums to heat and soften resin bars 4. The portions of the peripheries of the drums opposite the resin bar feed means 12 and 12' and the positions at which the respective rotary drums to come into contact with the strip of expanded sheet 7 are left clear. The belts extend approximately 180° around the drum. The heating belts 13 and 13' are endless belts of stainless steel each being Teflon-coated (Teflon is the tradename of a product sold by E. I. du Pont de Nemours & Co., Inc. of U.S.A.) on the surface which faces the drums to prevent the heated and softened resin from adhering thereto. The heating belts 13 and 13' are heated and kept warm respectively by electric heaters 14 and 14' disposed at three locations along the rims of the respective belts. Each of the electric heaters 14 and 14' is in contact with the rear face of the heating belts 13 and 13' to conduct the heat to the belt. In addition, there are driving rolls 16 16' for moving the belts at the same speed as the peripheral speed of the drums 10 and 10'.

The resin bars 4' which have been heated and softened are carried by the rotary drums 10 and 10' against and are adhered from above and below to the faces of the strip of expanded sheet at positions where the drums have rotated approximately 270° from the feed means 12 and 12' and are released from grooves 11 and 11' so as to remain on the faces of the strip of expanded sheet. The resin bars are pressed from above and below and molded around the parts of the expanded portion 1 by a pair of press rollers 17 and 17'.

An embodiment wherein a polypropylene bar is used will be described hereinafter. A square cross-section bar of polypropylene resin 2 by 2 mm is cut into lengths of 105 mm, equal to the width of the expanded portion 1 of the expanded sheet. The square bars are placed in the grooves 11 and 11' from the feed means 12 and 12'. The rotary drums 10 and 10' each 1.6 m in diameter rotate at a peripheral speed of six meters per minute which is equal to the running speed of the strip of expanded sheet. A polypropylene bar 4 comes into contact with the heating belts 13 and 13' at a position where each of the drums has rotated approximately 45° from the feed means, and are heated to approximately 220° by heat from the heaters 14 and 14'. The polypropylene bars are heated by the heat belts to a temperature of approximately 80° C. during the time it takes each of the drums 10 and 10' to rotate 135°, with the result that half of the thickness of the bar, which is toward the heated face, is softened. At a position where the bar is separated from the heating belts 13 and 13' after rotation through approximately 225° from the feed means, the temperature of the entire bar rises to approximately 160° C. and becomes half-molten. It takes about nine seconds to heat the bar to this half-molten condition.

Each of the molten polypropylene bars 4' is adhered from above and below on the faces of the strip of expanded sheet 7, which is fed at a position where the drum has rotated through 270° after each of the bars had been placed in the grooves 11 and 11' at the feed position. Each of the bars is separated from the groove in which it is held due to the adhering force and remains on the corresponding face of the expanded sheet. The bars pass between a pair of press rolls 17 and 17' after approximately two seconds, the spacing between the press rolls being set at the same dimension as the thickness of the expanded sheet. The bar is pressed and molded into a frame body as shown in 4' in the reticulated portion of the expanded sheet 1 by the pressing force of the press rolls.

Thereafter, the polypropylene bar 4' is cooled and hardened under the ambient conditions with the bar filling portions of the diamond-shaped openings in the reticulated portion and being molded around the narrow grid bars to form a rigid frame body as shown at 4" of FIGS. 4(A) and (B). The bars are preferably secured at 100 mm intervals.

The method of molding the thermal plastic resin frame body in accordance with the present invention is characterized in that the amount of resin required for molding each frame body is equal, each molded frame body has a uniformly finished thickness and width, and defective frame bodies due to a shortage of the resin supplied and material loss due to excessive added amounts does not occur, since the resin used, is cut into a given length.

Figure 4:
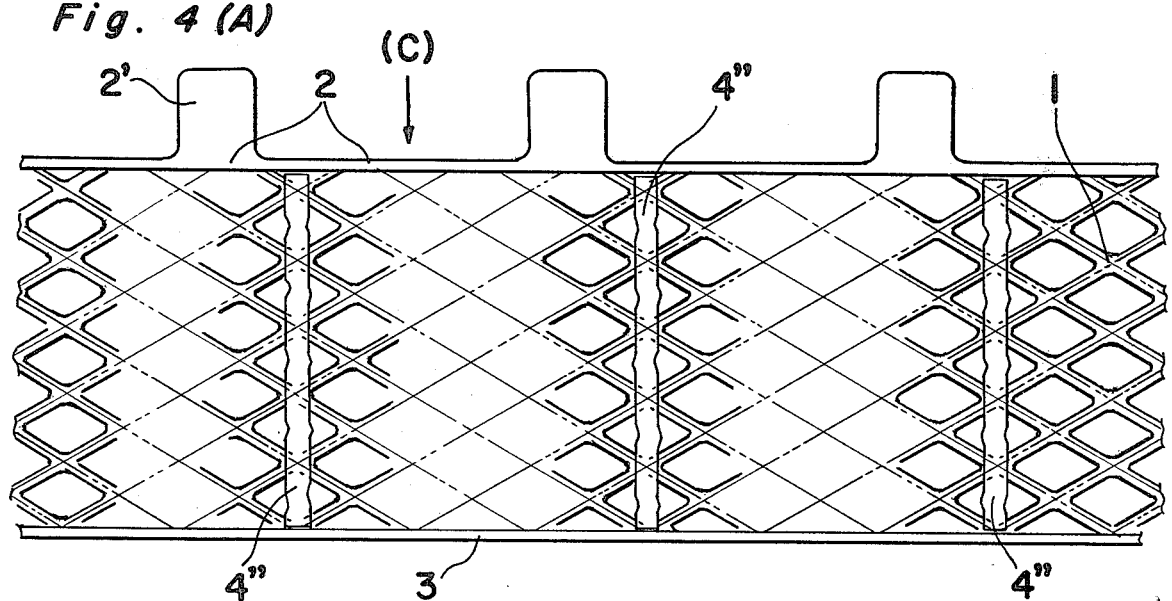
Figure 4:
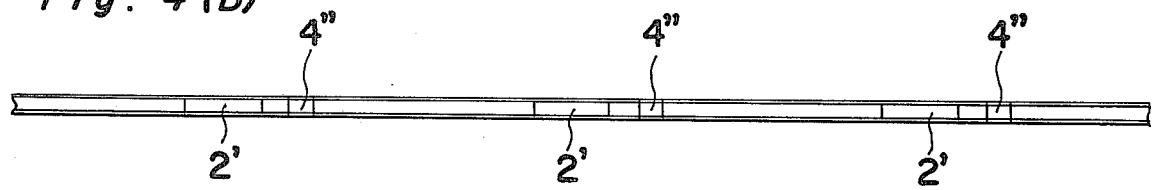

Also, by simultaneously molding the resin frame body from both faces of the expanded sheet, the frame body is uniformly provided on the both sides of the sheet, embracing the grid bars, as shown in FIG. 4, with the result that there is no slipping of the active material out of the expanded portions of the sheet and no curvature is caused. According to the method of the present invention, the fusing temperature of the resin is so low that the resin is not completely fused, as compared with other methods such as an injection molding method or a fixed quantity pouring method, and adhesion of the resin bar to the faces of the strip of expanded sheet is by partial thermal fusing. In the frame body molding method of the present invention, wherein the molding of completely fused material not used, the resin is not spread more than necessary. The frame body 4" can be provided in predetermined desired shape.

In the method for fusing and adhering the resin bar, a polypropylene bar was given as one example. With any other resin, such as polyvinyl chloride, polyetylene, AS, ABS, having thermal plasticity, the heating temperature and heating time can be changed depending upon the resin. Thus, they can be used in exactly the same manner.

A method of filling the active material into the expanded sheet and cutting a plate therefrom after the frame body of the polypropylene resin has been molded in a desired position on the expanded sheet as shown in FIG. 4 will be described hereinafter.

The active material is filled into the reticulated portion of the expanded sheet by a conventional pasting machine. A continuous plate 8 which is filled with paste is subjected to a treating process such as drying, etc. if necessary and thereafter is cut, by a cutter 18 and a die 19, at a position corresponding to a central line through the polypropylene frame body 4″ as shown schematically in FIG. 5, whereby the individual plate can be obtained. In this process, the cut end portion is protected by frame body portions 6 and 6′, each having a given width, made of synthetic resin. Accordingly, the pasty active material 5 does not slip out, during the cutting operation, as in the prior art methods. A better quality plate can be provided.

As shown in FIGS. 6A and 6B the cut frame portions 6 and 6′ form edges across the reticulated portion and close the diamond-shaped openings on the both ends of the plate. The polypropylene resin frame portions 6 and 6′ are half as wide as the frame body 4″. Thus, the active material can be filled into the openings on the the right and left ends of the plate. Accordingly, the pasty active material in the parts of the diamond-shaped openings on the ends of the plate is not exposed in the same way as in prior art plates as shown at 5a and 5b in FIG. 8, but rather is protected by the frame body portions. The slipping-out of the active material, which is caused by the mutual contact among the plates or the mechanical vibrations in the assembling process of the battery, can be prevented. During use of the battery, the peeling-off of the active material due to charge and discharge is extremely small as compared with the construction of FIG. 8, in which the cut end of the conventional expanded grid is not treated. Short-circuit accidents can be prevented.

In addition, the inferior bending strength with respect to the plate height, which is a defect of plates made by a method wherein the strip of expanded sheet is used as a grid body, can be improved by provision of rigid frame body portions 6 and 6′ of the thermal resin. FIG. 7 is an enlarged view of the cut end of an individual plate 9. The grid bars 21 are exposed on the end face of the resin frame body portions 6 and 6′. Hardly any flash and flare are caused during the cutting operation.

The method of the present invention has an advantage in that the service life of the battery is extended by overcoming the disadvantages of the conventional expanded grid.

As shown in FIG. 6(A) in the lead storage battery plate of the present invention, an expanded portion 1 with many diamond-shaped openings therein is formed between the unexpanded portion 2 provided with a lug portion 2′ and the other unexpanded portion 3. The right and left end portions of the expanded portion, which are not in contact with the unexpanded portions are closed, respectively, by the synthetic resin frame body portions. The pasty active material is filled in all the diamond shaped openings.

Such a plate has advantages in that the plate has the characteristics of the expanded grid, which are thinness, light weight and superior material use, and the active material is prevented from slipping out, due to closure of the cut end with the frame body portions of the synthetic resin.

In the expanding operation, an extremely thin grid 1 mm or less thick, which has not been possible to make by a conventional casting method, can be formed. The lead-calcium alloy which has been considered impossible to use in a casting operation can be made into a sheet or thin sheet. The grid can be formed without cutting of the grid bars. Also, the cut ends can be positively closed by the synthetic resin frame body portions.

FIG. 9 shows a lead storage battery, using plates according to the invention as shown in FIG. 6A. The plate 9, if the expanded grid is used, can prevent short-circuits on the ends of the plates not only during the formation of a group of plates, but also in the assembly of the plates in the battery, since the right and left ends of the expanded grid are body portions.

In FIG. 9, the groups of plates located adjacent the opposite sides of the partition 22 are connected by a connector 23 extending through the partition. Lug portions 2′ on the same polarity plates either positive plates or negative plates, are soldered to the connector 23. Numeral 24 designates a cover. Numeral 25 designates a hole provided in the cover to pour liquid into the battery.

Also, it is preferable that the frame body which is used to close the right and left end portions of the expanded grid made of lead alloy, be of a thermal plastic synthetic resin because it is easier to use in a continuous manufacturing operation and to install on the reticulated portion of the expanded shut. But the frame body can be made of heat curing synthetic resin such as epoxide resin or phenol resin. When such heat curing synthetic resin is used, the application thereof to the expanded grid portion and the thickness are considerably greater than the grid bars.

For a better operation of filling the pasty active material after the mounting of the resin frame bodies on the expanded grid, it is preferred that the resin frame bodies are not on the plane of the unexpanded portion, which is on the same plane as the plane of the reticulated expanded portion, in contact with both end portions in the thickness direction of the unexpanded portion of the grid.

As is apparent from FIG. 7, the resin frame body portion disposed on the expanded portion is almost flat on the entire surface with the resin at the crossed portions of the grid bars being thinner than the resin located in the openings in the reticulated portions.

In the lead storage battery plate of the present invention, the slipping out of the pasty active material from the right and left ends of the expanded grid, which has heretofore occurred, has been prevented by closing the ends of the openings in the reticulated portions at the right and left ends of the plate with the synthetic resin frame body portions. The plate is thinner, lighter, has a better performance and is superior in material loss. Such plates as described hereinabove can be provided with better efficiency.

Although the present invention has been fully described in connection with the preferred embodiment thereof with reference to the accompanying drawings, it is to be noted that various changes and modifications will be apparent to those skilled in the art. Therefore, such changes and modifications are to be construed as included within the true scope of the present invention unless they depart therefrom.

What is claimed is:

1. A method of making lead storage battery plates, comprising the steps of forming an elongated strip of reticulated sheet material having openings therein and having unreticulated portions along the opposite edges thereof, placing elongated bodies of synthetic resin at intervals along said elongated strip extending across the strip at least to the unreticulated portions and adhering said elongated bodies to said strip, filling pasty active mterial into the openings of said strip, and then cutting the strip and said elongated bodies transversely of the strip along lines intermediate the edges of said elongated bodies for separating the battery plates from the strip.

2. The method as claimed in claim 1 in which the synthetic resin is a thermal plastic synthetic resin selected from the group consisting of polypropylene, polyethylene, polyvinyl chloride, arcylonitrile.styrene resin, and acrylonitrile.butadiene.styrene resin, and the step of placing the bodies of synthetic resin includes partially heating them for softening them and adhering them to the reticulated sheet material by pressure.

3. The method as claimed in claim 1 in which the synthetic resin is a thermal plastic resin, and said step of placing the bodies of synthetic resin comprises moving said strip in the direction of its length, heating said elongated bodies of synthetic resin to a half molten condition, feeding two bodies to positions on the respective opposite surfaces of said strip which are aligned with each other and in synchronism with the movement of the strip, and then pressing the thus positioned bodies toward each other to mold them around the portions of the reticulated strip which define the openings in the strip.

4. The method as claimed in claim 3 in which the step of heating the bodies comprises heating them as they are being fed toward the strip.

* * * * *